United States Patent [19]

Lynam

[11] Patent Number: 5,073,012
[45] Date of Patent: Dec. 17, 1991

[54] ANTI-SCATTER, ULTRAVIOLET PROTECTED, ANTI-MISTING, ELECTRO-OPTICAL ASSEMBLIES

[75] Inventor: Niall R. Lynam, Holland, Mich.

[73] Assignee: Donnelly Corporation, Holland, Mich.

[21] Appl. No.: 496,271

[22] Filed: Mar. 20, 1990

Related U.S. Application Data

[63] Continuation of Ser. No. 155,256, Feb. 12, 1988, abandoned.

[51] Int. Cl.⁵ .................... G02F 1/13; G02B 17/00
[52] U.S. Cl. .................... 359/265; 359/250; 359/245; 359/361; 359/507; 359/870; 359/603; 359/604; 359/96
[58] Field of Search ............... 350/1.6, 278, 279, 283, 350/338, 349, 353, 385, 388, 392, 582, 642, 356, 357

[56] References Cited

U.S. PATENT DOCUMENTS

| | | | |
|---|---|---|---|
| 3,280,701 | 10/1966 | Donnelly et al. | 350/357 |
| 3,443,859 | 5/1969 | Rogers | 350/312 |
| 3,806,229 | 4/1974 | Schoot et al. | 350/160 |
| 3,867,175 | 2/1975 | Dornte | 350/582 |
| 3,869,196 | 3/1975 | Kubota | 350/160 LC |
| 3,900,673 | 8/1975 | Mattimoe et al. | 428/339 |
| 3,933,407 | 1/1976 | Tu et al. | 350/582 |
| 4,022,628 | 5/1977 | Deeg | 65/30.13 |
| 4,153,526 | 5/1979 | Cherenko et al. | 204/159.21 |
| 4,218,500 | 8/1980 | Radisch | 428/78 |
| 4,232,080 | 11/1980 | Orain et al. | 428/215 |
| 4,315,053 | 2/1982 | Poth et al. | 428/423.7 |
| 4,338,000 | 7/1982 | Kamimori et al. | 350/357 |
| 4,408,837 | 10/1983 | Kozaki et al. | 350/336 |
| 4,435,048 | 3/1984 | Kamimori et al. | 350/357 |
| 4,496,611 | 1/1985 | Kawakubo et al. | 428/425.5 |
| 4,505,538 | 3/1985 | Toussaint et al. | 350/357 |
| 4,521,078 | 6/1985 | Baeger | 350/334 |
| 4,521,079 | 6/1985 | Leenhouts et al. | 350/339 R |
| 4,533,601 | 8/1985 | Hermann et al. | 29/14 |
| 4,543,283 | 9/1985 | Curtze et al. | 428/38 |
| 4,549,894 | 10/1985 | Araujo et al. | 65/30.11 |
| 4,556,288 | 12/1985 | Sekimura | 350/339 R |
| 4,565,424 | 1/1986 | Huffman et al. | 350/349 |
| 4,572,619 | 2/1986 | Reininger et al. | 350/392 |
| 4,632,877 | 12/1986 | Watanabe et al. | 428/409 |
| 4,657,796 | 4/1987 | Musil et al. | 428/38 |
| 4,664,479 | 5/1987 | Hiroshi | 350/338 |
| 4,671,619 | 6/1987 | Kamimori et al. | 350/357 |
| 4,676,601 | 6/1987 | Itoh et al. | 350/278 |
| 4,749,261 | 6/1988 | McLaughlin et al. | 350/347 V |
| 4,793,669 | 12/1988 | Perilloux | 350/1.6 |
| 4,852,979 | 8/1989 | Agrawal | 350/357 |
| 4,902,108 | 2/1990 | Byker | 350/357 |

FOREIGN PATENT DOCUMENTS

| | | |
|---|---|---|
| 79044 | 5/1983 | European Pat. Off. . |
| 240226 | 10/1987 | European Pat. Off. . |
| 2732727 | 7/1977 | Fed. Rep. of Germany . |
| 2513198 | 3/1983 | France . |
| 58-146202 | 10/1983 | Japan . |
| 61-7803 | 1/1986 | Japan ............... 350/278 |
| 61-94819 | 6/1986 | Japan . |

OTHER PUBLICATIONS

The Merck Index, an Encyclopedia of Chemicals, Drugs and Biologicals, 10th Edition, 1983, p. 158.
"Anti-Lacerative Windshields-An Overview", SAE Technical Paper series, 840388 by N. W. Johnston, S. H. Herliczek and C. E. Ash, Feb. 27–Mar. 2, 1984.

(List continued on next page.)

Primary Examiner—Rodney B. Bovernick
Assistant Examiner—David R. Parsons
Attorney, Agent, or Firm—Price, Heneveld, Cooper, DeWitt & Litton

[57] ABSTRACT

A laminate, electro-optic rearview mirror assembly is disclosed which is protected against scattering fragments while reducing risk of laceration if broken/damaged, against ultraviolet (UV) radiation degradation, and against fogging or misting in high humidity conditions.

39 Claims, 4 Drawing Sheets

OTHER PUBLICATIONS

Ultraviolet Radiation, pp. 4-7, Second Edition, Lewis R. Koller, John Wiley & Sons, Inc., New York, copyright 1952, 1965.

Chemicals and Additives, p. 178, Modern Plastics Encyclopedia, 1988.

Shelepin, I. V. et al., "Electrochromism of Organic Compounds-Electrochemical and Spectral Properties of a System Based on Methylviologen and 3-Ethyl-2-Benzothiazolone Azine", Scientific Research Institute of Intermediates and Dyes, Moscow, translated from Electrokhimiya, vol. 13, No. 1, pp. 32-37, Jan., 1977.

Preamble to Amendment to Motor Vehicle Safety Standard No. 205-Glazing Materials (Docket No. 71-1; Notice 3), Jun. 21, 1972.

ANTI-SCATTER, ULTRAVIOLET PROTECTED, ANTI-MISTING, ELECTRO-OPTICAL ASSEMBLIES

CROSS-REFERENCE TO RELATED APPLICATION

This application is a continuation of prior pending application Ser. No. 07/155,256, now abandoned filed Feb. 12, 1988, by Niall R. Lynam, entitled "ANTI-SCATTER, ULTRAVIOLET PROTECTED, ANTI-MISTING, ELECTRO-OPTICAL REARVIEW MIRROR."

BACKGROUND OF THE INVENTION

This invention relates to rearview mirrors for vehicles and, more particularly, to an enhanced vehicular rearview mirror incorporating an electro-optic medium allowing variation in the light reflected by the rearview mirror in response to application of an electric field to the electro-optic medium. Specifically, the invention is a variable reflectance, electro-optic mirror including protection against laceration injuries and scattering of glass or other fragments if broken or damaged, against degradation from ultraviolet radiation, and against fogging and misting in high humidity conditions.

In a collision, the glass typically used as the substrate in vehicular rearview mirrors poses potential hazards to the driver or other vehicle occupants. Since glass easily shatters into sharp, irregular fragments, there is a high likelihood of facial or other injury, typically lacerative in nature, in any collision. For this reason, prior known interior and exterior vehicular rearview mirrors, which typically consist of a single glass piece coated with reflective material, are conventionally protected by applying a tape or a plastisol-type plastic adhesive to the back surface of the glass piece. Accordingly, if impacted or broken in an accident, and shattered, glass fragments are retained by the tape or plastisol-type plastic adhesive.

More recently, however, a new generation of electro-optical mirrors has emerged which are fabricated using two pieces of glass separated by a gap or space which contains an electro-optic medium allowing variation in the light reflected by the assembly. For example, in liquid crystal rearview mirrors, the space between the transparent front and reflective coated rear glass pieces is filled with a semi-viscous liquid crystal material. In electrochemichromic or electrochromic mirrors, the gap or space contains a liquid, thickened liquid, gel or semi-solid material.

In these types of electro-optic, laminated mirror assemblies, scatterproofing of the rear glass piece is relatively easy since tape or plastisol-type plastic adhesives can be applied to its rear surface behind the reflective coating in the conventionally known manner However, scatterproofing the front piece of glass in such a laminated assembly is difficult since the material used to fill the space between the front and rear glass pieces is usually insufficiently viscous or adhering to retain fragments of the front glass should it shatter in a collision.

Another problem encountered with electro-optic rearview mirrors is degradation due to exposure to ultraviolet radiation over the life of the mirror. Ultraviolet (UV) radiation from the sun which penetrates the earth's atmosphere has a wavelength in the range between 290 and 400 nanometers (nm) and can cause breakdown in the operational characteristics of the electro-optical medium including chain scission, crosslinking and stimulation of chemical changes in the chemicals used to formulate the electro-optical medium. This interferes with electronic conjugation in the aromatic conjugated materials typically used and thus the electro-optic activity of those materials. Moreover, the medium will often discolor and drastically affect the usefulness of the rearview mirror.

Yet another problem is unwanted misting or fogging of the rearview mirror surface when the vehicle encounters high humidity conditions. For example, in damp, cold conditions where the interior passenger compartment of a vehicle has a highly humid atmosphere, water droplets may tend to condense on the rearview mirror surface thereby obscuring vision in the mirror. Not only does such condensation prevent effective use of the mirror, but also requires frequent wiping by the vehicle driver which distracts his attention from driving.

Accordingly, a need is apparent for a laminate electro-optic vehicular rearview mirror which can be effectively scatterproofed to retain glass fragments from both glass pieces in the mirror, protected against lacerative-type injuries, protected against ultraviolet radiation damage throughout its life, and protected against annoying fogging and misting of the mirror surface in high humidity conditions.

SUMMARY OF THE INVENTION

The present invention overcomes the above problems by providing a laminate electro-optic vehicular rearview mirror which is protected against scattering of glass or other mirror element fragments if broken or damaged in a collision while reducing the risk of laceration from contact with the front glass or other element. In addition, the assembly is protected against degradation by ultraviolet radiation. The ultraviolet radiation reduction may be incorporated together with the scatterproofing, anti-lacerative protection. Further, the assembly may incorporate anti-fogging/anti-misting materials which prevent or reduce condensation and fogging in high humidity conditions.

In one form, the invention is an anti-lacerative, scatter protected, laminate, electro-optic rearview mirror assembly including first and second spaced optically transparent elements mounted in a mirror case. The elements each have front and rear surfaces defining a space between the rear surface of the first element and the front surface of the second element. An electro-optic medium is included in the space and has a light transmittance variable upon application of an electric field. Means are provided for applying an electric field to the electro-optic medium to cause variation in the light transmittance thereof. A reflective coating is included on one surface of the second element and is adapted to reflect light incident thereon through the first element and the electro-optic medium. A layer of optically transparent, tear/perforation resistant material is adhered to the front surface of the first element for retaining and preventing scattering of fragments from that element in the event of damage or breakage and for reducing risk of laceration from contact with the first element if damaged or broken.

The optical elements may be glass or plastic. The anti-lacerative, anti-scattering layer preferably is a sheet of polymer material such as reticulated polyurethane. In order to reduce ultraviolet radiation transmitted into the assembly, the polymer may be a combination of polyvinylbutyral and polyester which has ultraviolet radiation reducing properties. Alternately, the anti-lacerative layer may incorporate ultraviolet radiation absorbing, blocking or screening additives selected from the group including benzophenones, cinnamic acid derivatives, esters of benzoin acids, salicylic acid, terephthalic and isophthalic acids with resorcinol and phenols, pentamethyl piperidine derivatives, salicylates, benzotriazoles, cyanoacrylates, benzilidenes, malonates and oxalanilides which may also be combined with nickel chelates and hindered amines. These additives also stabilize the anti-lacerative layer itself against ultraviolet degradation.

Another UV radiation reducing alternative is the use of a clear, transparent UV transmission reducing coating preferably applied to the front surface of the front glass element followed by the anti-lacerative, scatterproofing polymer layer.

It is also possible to incorporate a sheet polarizer with the anti-lacerative layer, or apply a dichroic, reflective filter material to the glass element which provides wide band ultraviolet radiation reduction. Examples of such filters include thin film stacks.

It is also possible to substitute a laminated glass assembly for the front element, such assembly including a pair of glass panels adhered to one another with a sheet of polyvinylbutyral or sheet polarizer which have ultraviolet radiation reducing qualities. An anti-lacerative layer may be applied to the front surface of the first of the two glass panels in such a laminate.

A second form of the invention is a reduced ultraviolet radiation transmitting laminate electro-optic rearview mirror assembly which also includes first and second spaced optically transparent elements, an electro-optic medium therebetween, means for applying an electric field to the electro-optic medium and a reflective coating on one surface of the second element. In this form, ultraviolet radiation reducing means are incorporated in the assembly for reducing transmission of ultraviolet radiation into the electro-optic medium and the assembly.

Preferably, such ultraviolet radiation reducing means may include glass having an increased iron oxide or cerium oxide content or other specialized glasses which are highly transmitting in the visible portion of the electromagnetic spectrum but have greatly reduced transmission in the ultraviolet portion of the electromagnetic spectrum. Anti-lacerative layers may be adhered to the front surface of such UV reducing glass to both strengthen the glass and provide anti-lacerative, scatterproofing properties. When such anti-lacerative layers are used, similar UV absorbers, blockers and screening materials may be incorporated in such layer. Alternately, sheet polarizers, transparent, UV reducing coatings, and UV radiation dichroic reflective filter materials may be used or added. Anti-fogging additives may also be included.

It is also possible to incorporate UV radiation reducing additives directly in the clear plastic when such plastic is used to form the first optical element. Alternately, UV reducing additives can be added to the electro-optic medium for UV stabilization.

Accordingly, the present invention recognizes and applies novel protective concepts to laminate, electro-optic vehicular rearview mirrors not previously obtained. The invention solves three difficult problems encountered in prior commercialization of laminate electrochromic mirrors, namely, scatter protecting the front glass element, reducing lifetime ultraviolet degradation problems arising from the UV instability of the typical electro-optical medium sealed between the glass elements, and reducing fogging or misting caused by condensation in high humidity conditions. In addition, these results are obtained in an economical manner easily incorporated in existing rearview mirror cases requiring no specialized supports or surrounding apparatus in the vehicle.

These and other objects, advantages, purposes and features of the invention will become more apparent from a study of the following description taken in conjunction with the drawings.

DESCRIPTION OF THE PREFERRED EMBODIMENTS

Figure 1:
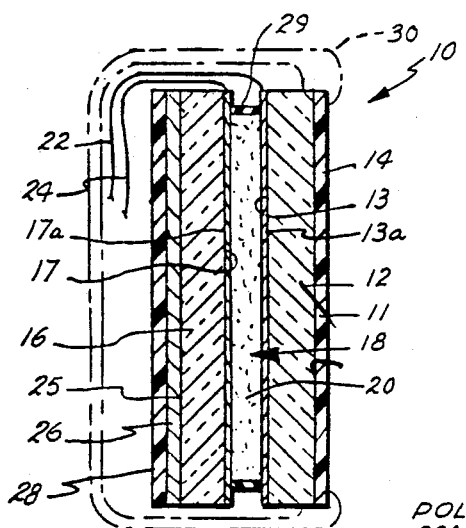
FIG. 1 is a sectional side elevation of a scatter protected, anti-lacerative, laminate, electro-optic rearview mirror assembly of the present invention.

Referring now to the drawings in greater detail, FIG. 1 illustrates a laminate, electro-optic rearview mirror assembly 10 having a front element 12 which is scatter and anti-lacerative protected with a resinous, polymeric or other coated or applied layer 14 on its first or front surface 11. Element 12 is preferably formed from a generally planar sheet of conventional soda lime window glass as is second glass element 16 which is spaced slightly rearwardly from front glass piece 12 to define a gap or space 18 for receiving an electro-optic medium 20 as explained below. As explained hereinafter, elements 12, 16 may also be resinous, polymeric sheets to further prevent fragment scattering and lacerative injuries if broken and to reduce weight. Space 18 is formed between the generally parallel rear surface 13 of front glass element 12 and forward facing surface 17 of rear glass element 16. Preferably, each of the front and rear surfaces 13, 17 is coated with a layer of indium tin oxide (ITO) which is substantially transparent to incident visible light yet is sufficiently electrically conductive to enable application of an electric field or voltage across space 18 between ITO layers 13a, 17a. Electrical energy is provided by wire leads 22, 24 secured in conventional manner to the upper portions of ITO coatings 13a, 17a as shown in FIG. 1.

The rear surface 25 of rear glass element 16 is coated with a reflective layer 26 preferably of metallic material such as aluminum, or a combination of silver and copper as is conventionally known. Such layer provides a highly specular surface which reflects approximately 80-90% of the light incident thereon through layer 14, front and rear glass elements 12, 16 and electro-optic medium 20 in space 18. In order to prevent scattering of glass fragments from the rear glass element 16 in the event of breakage or damage during a collision in the vehicle, a layer 28 of tape or a plastisol-type plastic adhesive, typically about 0.1 millimeters thick, is applied to the rear surface of reflective coating 26. Anti-scattering layer 28 may be opaque, translucent or transparent since it is behind reflective coating 26 and need not transmit or reflect an light.

In order to confine and retain the electro-optic medium in gap 18, a peripheral seal 29, formed from an epoxy material which adheres well to the ITO coatings 13a, 17a on glass surfaces 13, 17 is applied adjacent the periphery of glass elements 12, 16. A suitable epoxy sealing material is EPON 828 (trademark) from Shell Chemical Company of Houston, Texas cured by polyamide based curing agents such a V-40 (trademark) from Miller Stephenson Company of Danbury, Conn. The epoxy is preferably silk screened onto the inner surface of the front glass element 12 or the back glass element 16 or onto both glass elements. The corresponding glass element is then placed face to face with the still tacky epoxy. Seal 29 is then fully cured, typically by placing the assembly into an oven at 110° C. for three hours. Gap 18 can then be filled by a variety of means such as simple injection of electro-optically active material using a syringe or by vacuum backfilling using a technique well established for manufacture of liquid crystal devices.

Assembly 10 is preferably incorporated in a molded thermoplastic or other mirror case 30 of conventional form and supported within a vehicle in a conventionally known manner through an articulated support from the inside windshield surface or a header mounted support arm.

Typically, glass elements 12, 16 will each be two millimeters in thickness while ITO coatings 13a, 17a will have a typical thickness of 1,500 angstroms. Reflective coating 26 may have a thickness within the range of between about 500 and 1,000 angstroms. Various types of electro-optic media may be inserted in gap 18. For example, a suitable liquid crystal material in which molecules are oriented to block the passage of light therethrough when an electric field is applied is a guest host dye such as D5 (trademark) produced by BDH Co. of Dorset, England dissolved in n-type nematic liquid crystal such as n-(p-methoxybenzilidene)-p'-butylaniline. For such material, cell gap 18 is typically 8 to 12 microns. For electrochemichromic mirrors, the gap may contain a liquid, thickened liquid, gel or semi-solid material such as formulations described in U.S. Pat. No. 3,806,229 to Schoot. In electrochromic mirrors, a material such as poly-AMPS (trademark) available from Lubrizol Corp. of Wickliffe, Ohio may be used. Also, a liquid, thickened liquid, gel or semi-solid material may be used as is conventionally known. Cell gap or space 18 is typically 50 to 100 microns in these electrochromic or electrochemichromic devices. With the latter materials, application of an electric field will cause the media 20 to color to successively darker colors or shades as larger voltages are applied. When voltage is turned off or reversed, the coloring is bleached allowing full transmittance of light and, hence, full reflectivity from reflective layer 26.

Because the electro-optic media 20 such as those described above are typically of relatively low viscosity and have little or no capability of retaining or holding solid elements thereto, the scatter and anti-lacerative protection conventionally available through the use of tape or plastisol layers such as those at 28 on rear glass element 16 has been unavailable for use with the front glass element 12 because transmission of light through the glass element must be unimpeded. The present invention overcomes that problem by providing scatterproofing, anti-lacerative layer 14 which retains fragments should glass element 12 be shattered. Layer 14 also provides enhanced anti-lacerative protection since it remains intact upon collision, is tear and perforation resistant and thus reduces or avoids laceration injury to the skin of any person contacting the shattered or broken mirror.

A specific example of a material found useful for layer 14 is reticulated polyurethane having a thickness within the range of about 0.01 to about 0.25 inches and marketed under the trade name SECURIFLEX (trademark) by Saint-Gobain Vitrage of Paris, France. When used as layer 14, SECURIFLEX has excellent adhesion to glass surface 11 for retaining glass fragments during and after shattering in a collision. It also has high deformation capacity to resist tearing while continuing to form a protective screen which protects the skin of any person impacting the mirror and preventing contact with broken, jagged edges of the glass. It also has excellent optical quality, clarity and transparency so as not to detract from the rear vision capability of the rearview mirror. Further, it is abrasion and scratch resistant so that high quality clear images can be obtained in the mirror throughout its life. It is also relatively inert and resistant to environmental variation such as high and low temperatures, high and low humidity conditions.

Use of an anti-lacerative layer 14 also affords another advantage. It is known that several electro-optic mirror devices developed in recent years have generally poor ultraviolet radiation stability. When exposed to prolonged ultraviolet radiation from sunlight, such electro-optic assemblies may suffer substantial degradation of their electro-optic media resulting in poor electrical coloration responsiveness including increased response time and/or failure to properly bleach when electric voltage is switched off. Permanent discoloration of the medium may also occur. This can cause substantial vision problems. The present invention recognizes that us of ultraviolet radiation absorbing, blocking or screening materials, either incorporated in the anti-lacerative layer or in layers in addition to such layer, will reduce ultraviolet radiation impinging on the mirror assembly and the electro-optic medium and significantly prolong its lifetime.

Figure 2:
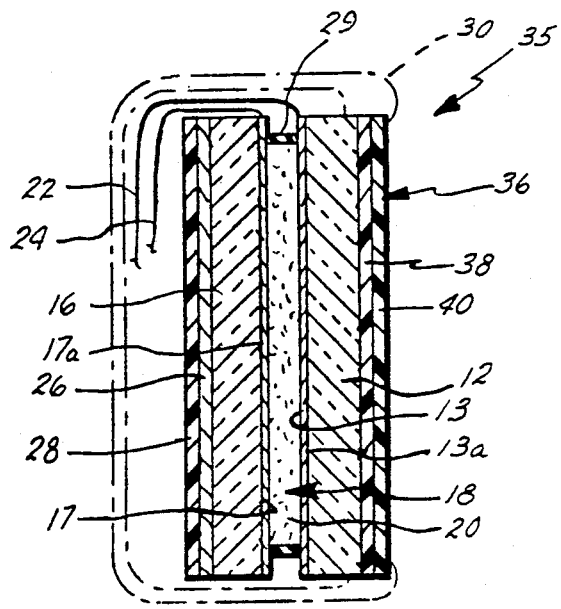
FIG. 2 is a sectional side elevation of a scatter protected, anti-lacerative and ultraviolet radiation protected, laminate, electro-optic rearview mirror assembly of the present invention.

As shown in FIG. 2, an enhanced, laminate, electro-optic rearview mirror assembly 35 with increased ultraviolet radiation resistance and stabilization is shown. As with subsequent embodiments of the invention explained below, assembly 35 is similar to the mirror assembly 10 of FIG. 1 but includes a different scatter protecting, anti-lacerative, UV radiation reducing layer 36 on the front surface of glass element 12. Layer 36 is preferably of two-ply construction comprising a laminate of polyvinylbutyral and polyester commercially available from E. I. Du Pont de Nemours and Company under Product No. Du Pont BE1028D and also has the same qualities as described for polyurethane layer 14. The outer ply or layer 40 is abrasion resistant, weather resistant, polyester while the inner ply or layer 38 is resilient, tear resistant polyvinylbutyral. Composite layer 36 has a thickness preferably between about 0.005 and 0.25 inches, and provides a solution to two problems found during commercialization of prior known laminate electro-optic, and especially electrochromic mirrors, i.e., difficulty in scatter protecting the front glass element 12 and protection against degradation of the electro-optic or electrochromic media 20 in space 18 throughout the lifetime of the assembly due to inherent ultraviolet radiation instability and sensitivity.

Figure 3:
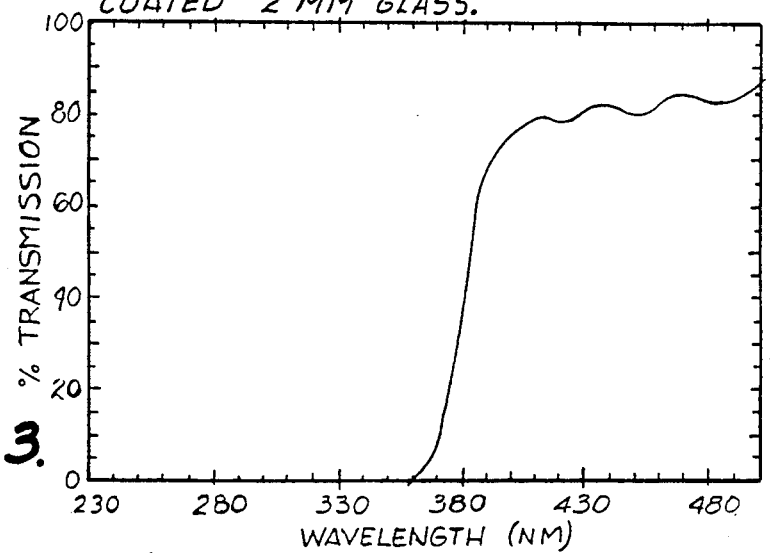
FIG. 3 is a graph showing percent transmission of electromagnetic radiation of wavelengths between 230 and 500 nanometers through a two millimeter glass sheet coated with indium tin oxide on one surface and having a sheet of polyvinylbutyral/polyester composite adhered to its opposite surface.
Figure 4:
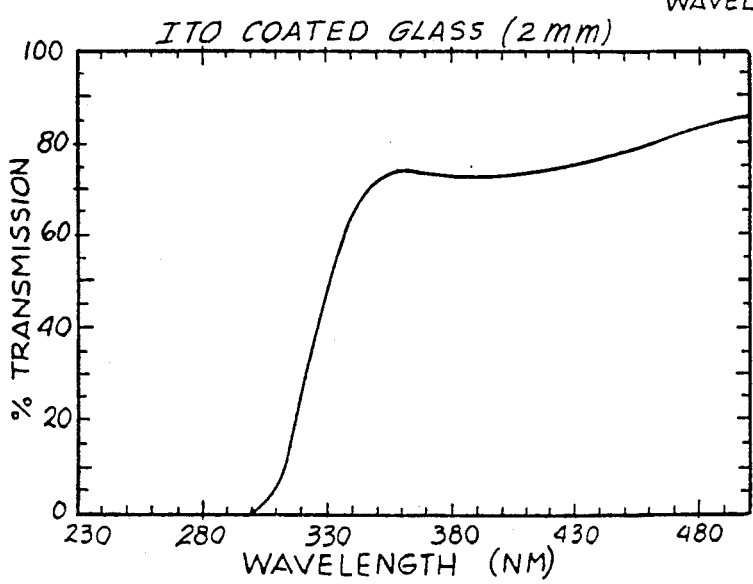
FIG. 4 is a graph of the percent transmission of electromagnetic radiation of wavelengths between 230 and 500 nanometers through a two millimeter glass sheet coated only on one surface with indium tin oxide.

The polyester/polyvinylbutyral composite layer 36 is a particularly good filter for ultraviolet radiation as shown in FIGS. 3 and 4. FIG. 3 is a graph of the percent transmission of electromagnetic radiation through a two millimeter thick element of conventional soda lime window glass coated with a layer of indium tin oxide (ITO) on one surface and a layer of Du Pont BE1028D polyvinylbutyral/polyester composite on the opposite surface. The graph shows the transmission over the wavelength spectrum between 230 and 500 nanometers (nm) and illustrates that below about 350 to 360 nm, wavelength transmission is cut off or stopped. Ultraviolet radiation which penetrates the earth's atmosphere from the sun typically ranges in wavelength over a wide band of between about 290 and 400 nanometers (nm). In contrast, light to the human eye ranges from about 400 nm to about 700 nm. Hence, the composite polyvinylbutyral/polyester layer 36 substantially eliminates ultraviolet radiation below about 350 nm while simultaneously scatter protecting and protecting against laceration when applied to the mirror glass surface.

Compare the graph in FIG. 3 to that in FIG. 4 which illustrates a two millimeter glass element coated only on one surface with indium tin oxide and not including a polyvinylbutyral/polyester layer. Such ITO coated glass transmits light in the visible wavelength spectrum above about 400 nanometers but also allows transmission of ultraviolet wavelengths down to about 295 nm which is substantially farther into the UV region than with the coated glass having the two-ply composite layer 36 thereon as shown in FIG. 3. Hence, reduction of UV radiation intensity passing through front glass 12 of such laminate mirrors as in assembly 35 substantially increases the useful lifetime of the mirror assembly.

A specific example of an assembly such as that shown at 35 comprising a laminate electrochromic mirror and providing the anti-lacerative, anti-scatter, UV radiation reducing advantages of the present invention was fabricated consisting of two plates of ITO coated, conventional soda lime window glass separated by a gap of 50 microns. The space between the two glass elements was filled with an electrochromic solution consisting of N,N,N',N' tetramethyl-1,4-phenylene diamine 0.025M, 1,1'-diheptyl-4,4'-bipyridinium dibromide 0.025M and tetrabutyl ammonium fluoroborate 0.5M dissolved in propylene carbonate. The nonmirrored front glass piece was anti-lacerative protected with a du Pont BE1028D two-ply, anti-lacerative layer consisting of an outer abrasion resistant layer of polyester and an inner layer of polyvinylbutyral as described above in connection with FIG. 2. Reflective coated, rear glass plate 16 was scatter protected on its rear surface using conventional tape. The assembly was shattered by dropping a one kg weight over a distance of one meter to impinge on the front nonmirrored glass element, the anti-lacerative layer retained glass fragments from the front glass and remained unperforated such that it would have provided anti-lacerative protection if struck by a person in an accident. Moreover, when this laminate electrochromic mirror assembly was placed under UV lamps in a sunlight simulator, electrochromic activity and general mirror performance was maintained for a period of some five (5) times longer than that obtained using a control sample which was similarly tested with UV radiation but was not anti-laceratively protected with a polyester/polyvinylbutyral layer.

Although the anti-scattering, anti-lacerative layer 14 of assembly 10 in FIG. 1 provides some ultraviolet radiation reduction protection, and is itself ultraviolet radiation stable, the polyvinylbutyral/polyester composite is preferred since the polyvinylbutyral ply or layer has significantly higher UV radiation reduction capability as well as inherent UV stability than does polyurethane.

Longer lifetimes for laminate electro-optic rearview mirror assemblies can be achieved by using ultraviolet radiation absorbing, blocking or screening materials added to or incorporated with the anti-scatter, anti-lacerative layers 14, 36 as shown in FIGS. 1 and 2. Most commercial polymers absorb ultraviolet radiation because they possess chromophoric groups either as regular constituents or as impurities. Only those chromophores which absorb electromagnetic radiation of a wavelength below about 400 nanometers are, therefore, effective screens against UV radiation. Polycarbonate, polyester and aromatic polyurethanes contain such chromophores as a major part of their structures. However, polyolefins contain only relatively insignificant amounts of these chromophores as impurities. Yet, these above materials do not absorb UV radiation uniformly over the entire UV range. The chromophores which do absorb UV radiation can be conjugated structures, carbonyl groups, aromatic repeat units and heterocyclic repeat units. In addition, if polymers are used as UV screeners, they themselves must be stabilize against UV radiation since UV absorption generates free radicals which lead to chain scission and cross-linking and creation of other structures in these polymers. Thus, UV radiation itself degrades the polymer material which is intended to provide a UV absorber, block or screen by making the polymer brittle and even imparting color in the visible region.

The addition of UV absorbing, blocking or screening additives to polymers such as the polyurethane and/or polyvinylbutyral/polyester composite layers 14, 36 makes these materials more efficient UV screeners and preserves their properties over a longer period of time. Such UV additives, known as stabilizers, are transparent in the visible region and work to absorb UV radiation, quench the free radicals which are generated in the polymer and prevent oxidation reactions which lead to polymer degradation. For example, UV stabilizing additives drawn from benzophenones, cinnamic acid derivatives, esters of benzoin acids, salicylic acid, terephthalic and isophthalic acids with resorcinol and phenols, pentamethyl piperidine derivatives, salicylates, benzotriazoles, cyanoacrylates, benzilidenes, malonates and oxalanilides are effective to block UV radiation and stabilize the polymer layer when impregnated in such layer, included in separate coatings in addition to such layer or incorporated directly in front element 12 such as when it is cast from plastic. Other additives may be combined with the above materials such as nickel chelates and/or hindered amines. The following table shows several combinations of commercially available polymers and UV additives which may be used:

| Polymer | Stabilizer |
| --- | --- |
| Polyolefins | 2-hydroxy-4-octoxybenzophenones |
| | nickel chelates |
| | hindered amines |
| Styrenics | hindered amines |
| | 2-hydroxyphenylbenzotriazole |
| PVC | benzotriazoles |
| | benzophenones |
| | acrylonitriles |
| Unsaturated Polyesters | 2-hydroxybenzotriazole |
| | benzophenone |
| Polyurethanes | benzotriazole |
| | pentamethyl piperidine |
| | derivatives |
| Polycarbonate | 2-hydroxy-phenylbenzotriazole |
| Polyamides | tetramethyl piperidyl sebacate |
| Acrylic | 2-hydroxyphenylbenzotriazole |

In many instances, two or more of such additives are combined together for increased synergistic effects in UV radiation reduction and stabilization.

UV stabilizers/blockers/filters/absorbers are incorporated directly into the polymer anti-lacerative layer(s) 14, 36 in a variety of ways. For polyvinylbutyral, UV blocking additives are compounded with the PVB resin. Alternately, the UV blockers are dissolved in plasticizers which are then used to plasticize the PVB. PVB can also be dissolved in a suitable solvent, with UV stabilizers next added to the PVB solution and a UV stabilized PVB film/sheet can be cast from this solution UV blockers can also be incorporated into polyester either through compounding or by solvent casting. Polyurethane anti-lacerative sheeting is a thermoset usually formed from reaction of isocyanate and polyols. Since both of these starting materials are liquids, UV blockers/stabilizers/filters/absorbers can be added to either the isocyanate component or the polyol component or to both. Concentrations of the various additives for combination with the various polymers are conventionally known such as are disclosed in U.S. Pat. No. 4,657,796 to Musil et al.

Figure 9:
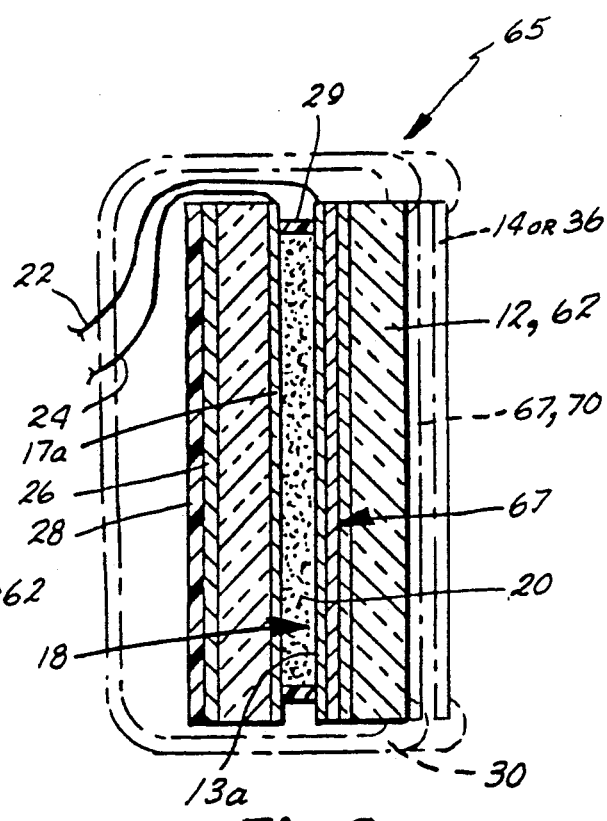
FIG. 9 is a second embodiment of an ultraviolet radiation protected, laminate, electro-optic rearview mirror assembly of the present invention.

As an alternative, UV blockers, filters or screens, or absorbers may be coated directly onto the front element 12, preferably on the first surface 11, regardless of whether it is glass or plastic (see FIG. 9). A clear transparent coating packed with UV blockers/filters/absorbers may be cast, spun, dipped, brushed, painted or sprayed onto glass surfaces through which UV radiation must pass before reaching the electro-optically active medium. A suitable solution can be made by dissolving a clear thermoplastic acrylic, polystyrene, NAS (70% polystyrene; 30% acrylic copolymer), polycarbonate, TPX (polymethylpentene), or SAN (styrene acrylonitrile copolymer) in a suitable solvent such as acetone, ethyl acetate, acetonitrile, tetrahydrofuran or any other common volatile solvent. To this, UV blockers are added such as Cyasorb (trademark) UV1084 or UV5411, available from American Cyanamid of Stamford, Conn., or any suitable material drawn from known UV blockers up to concentrations close to their solubility limit. Cyasorb UV5411 is a benzotriazole while Cyasorb UV1084 is an organo-nickel complex or nickel chelate. The solution so constituted can then be cast, spun, sprayed, brushed, painted or dipped onto, for instance, the outer surface of front glass element 12 followed by application of anti-lacerative layer 14 or 36 either with or without UV reducing additives as described above.

Figure 11:
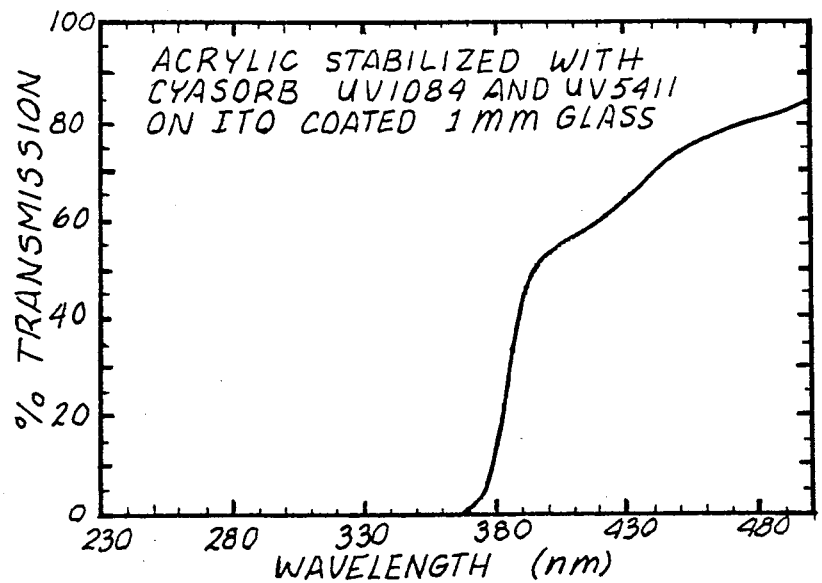
FIG. 11 is a graph showing percent transmission of electromagnetic radiation through a one millimeter glass sheet coated with indium tin oxide on one surface and a coating of clear acrylic including Cyasorb UV radiation reducing compounds on its opposite surface.
Figure 12:
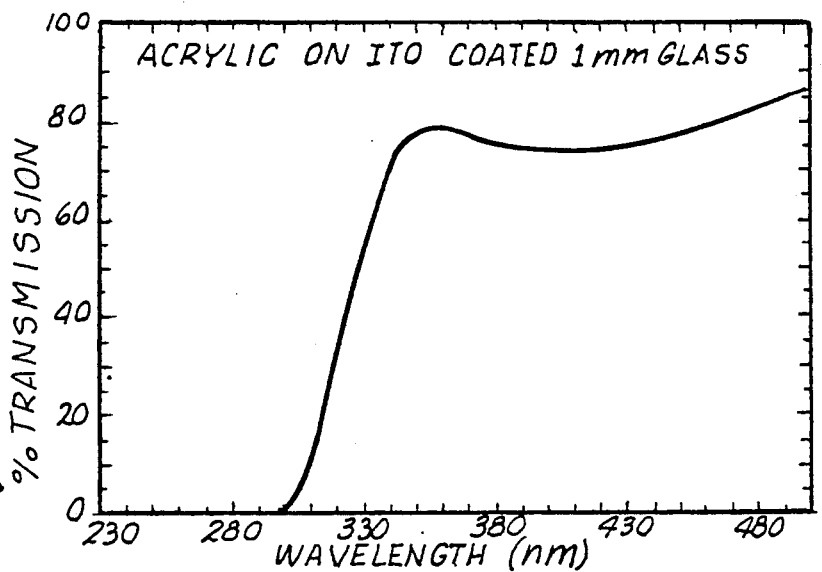
FIG. 12 is a graph showing percent transmission of electromagnetic radiation through a one millimeter glass sheet coated with indium tin oxide on one surface and a coating of clear acrylic on its opposite surface.
Figure 13:
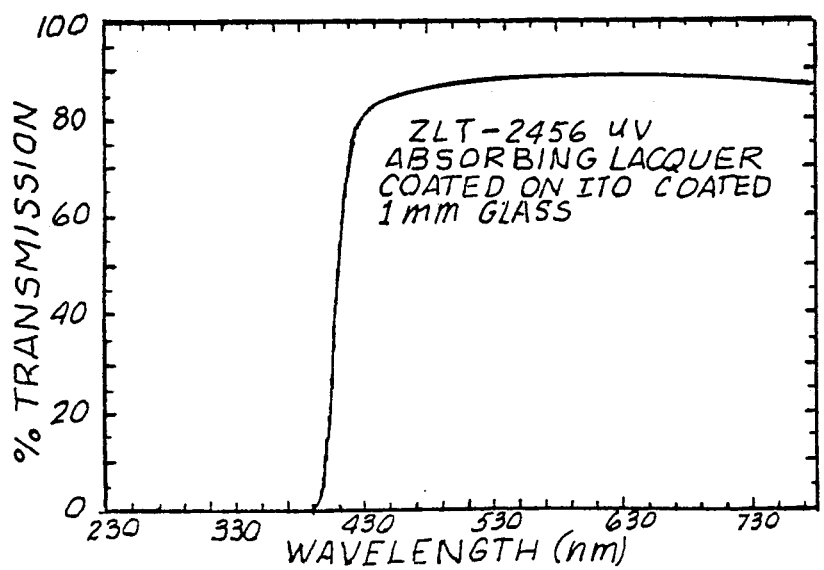
FIG. 13 is a graph showing percent transmission of electromagnetic radiation through a one millimeter glass sheet coated with indium tin oxide on one surface and clear UV protecting lacquer on its opposite surface.

For example, a 2.5% weight/volume casting solution was prepared by dissolving commercial acrylic sheeting in a 50:50 mixture of acetone and toluene. To 100 mls of this acrylic solution, 1.6 g of Cyasorb UV1084 and 1.89 g of Cyasorb UV5411, both supplied by American Cyanamid, Stamford Conn., were added. When cast onto a piece of one mm thick ITO coated glass in a thickness of about eight microns, the acrylic was UV stabilized and yielded the transmission spectrum shown in FIG. 11. Transmission through such coated glass in the region from about 280 nm to about 350 nm was markedly reduced compared to similar transmission spectra generated when only a 2.5% non-UV stabilized acrylic solution was cast onto ITO coated glass (FIG. 12) or when no acrylic was cast and a spectrum of ITO coated glass itself was generated (FIG. 4). In spite of low UV transmission, the UV stabilized cast acrylic coating was highly transparent in the visible portion of the electromagnetic spectrum Alternatively, UV stabilizers/blockers/filters/absorbers can be incorporated into the polysiloxane solutions, such as Dow Corning ARC (trademark) coatings, available from Dow Corning Inc. of Midland, Mich. These are commonly available to impart a transparent anti-abrasion coating onto optical plastics which can be used for front element 12 to further reduce fragment scattering and laceration-type injuries Alternately, UV stabilizers/absorbers/blockers/filters can be added to thermosetting optical plastics such as CR-39 (trademark) (allyl diglycol carbonate) or optical nylons or polysulfones. With thermosetting materials such as CR-39 optical plastic, available from PPG Industries, Inc. of Pittsburg, Penn., the UV absorbing, blocking or screening additive is incorporated in the initial plastic components and cast onto the front surface of front element 12 prior to assembly followed by suitable curing in the conventionally known manner.

If a UV absorbing/blocking/screening material such as CR-39 above is cast as a separate sheet, it may then be mounted on and adhered to front surface 11 of a clear plastic front element 12 with an adhesive bonding substance such as Versilok (trademark) acrylics available from Lord Corporation of Erie, Penn.. In such case a UV reducing additive such as benzotriazoles or hindered amines can also be incorporated directly in the adhesive bonding agent. Alternately, the sheet may be press laminated to the surface under increased pressure and modest heat.

Figure 5:
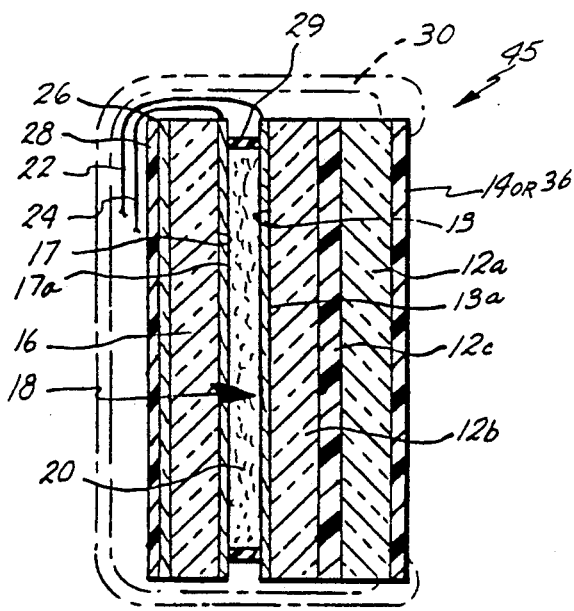
FIG. 5 is a second embodiment of the scatter protected, anti-lacerative and ultraviolet radiation protected, laminate, electro-optic rearview mirror assembly of the present invention.

As an alternative to adding the UV reducing additive materials to the scatter preventing, anti-lacerative layers 14, 36 or other polymers, or as coatings in combination with such anti-lacerative layers, or as coatings in combination with the addition of the above mentioned types of additives to such layers, other materials may be used to decrease the ultraviolet radiation passing through the front element 12 to the interior of the mirror assemblies as shown in FIGS. 5-10. In FIG. 5, where like numerals indicate like parts to those described above, a laminate, electro-optic rearview mirror assembly 45 has front glass 12 replaced with a laminate glass assembly comprised of a front glass element 12a having parallel front and rear surfaces adhered to a intermediate glass element 12b also having parallel surfaces by an interlayer 12c of polyvinylbutyral (PVB). Layer 12c is adhered to the rear surface of glass element 12a and the front surface of glass element 12b by heat and pressure lamination such as with the conventionally known autoclave method or the like. Glass elements 12a, 12b may be conventional soda lime window glass. The rear surface of glass element 12b is coated with indium tin oxide layer 13 which is, in turn, sealed with the front ITO coated surface of rear glass element 16 by seal 29 to provide the space 18. A scatter preventing, anti-lacerative, ultraviolet radiation reducing layer such as that shown above at 14 or 36 may be adhered to the front surface of front glass element 12a by suitable adhesives, heat, pressure or curing to provide the additional advantages noted above. However, the laminate glass assembly of assembly 45 inherently affords extra safety advantages by contributing to the reduction of ultraviolet radiation transmission into the assembly and providing greater shatter resistant strength for the assembly while providing scatter protection due to the use of the PVB layer 12c together with the anti-lacerative protection of layers 14 or 36.

Figure 6:
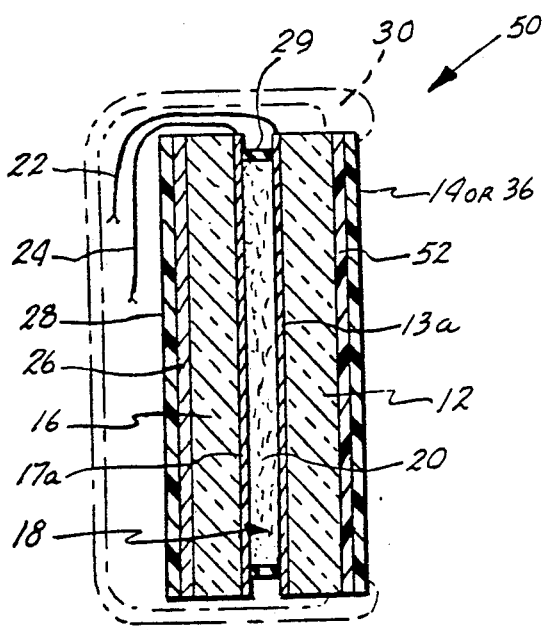
FIG. 6 is a third embodiment of the scatter protected, anti-lacerative and ultraviolet radiation protected, laminate, electro-optic rearview mirror assembly of the present invention.
Figure 7:
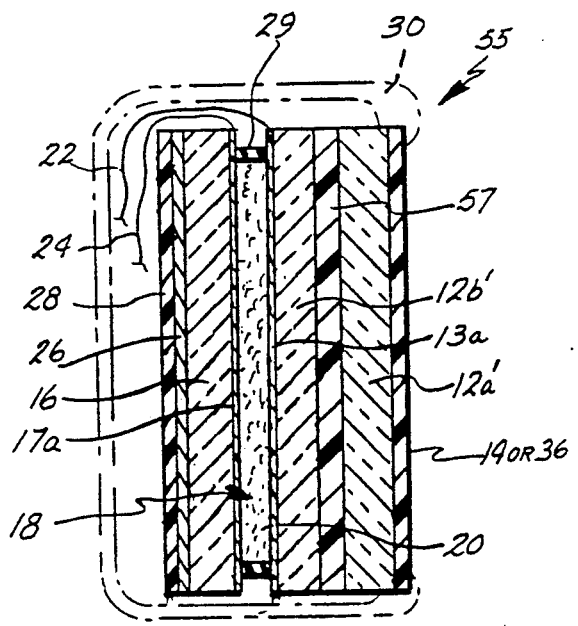
FIG. 7 is a fourth embodiment of the scatter protected, anti-lacerative and ultraviolet radiation protected, laminate, electro-optic rearview mirror assembly of the present invention.

With reference to FIGS. 6 and 7, where like numerals indicate like parts, it is also possible to incorporate sheet polarizers in the mirror assembly to further prevent ultraviolet radiation transmission into the assembly. In FIG. 6, a laminate electro-optic rearview mirror assembly 50 includes a layer of light polarizing sheet material 52 applied to the front surface 11 of front glass element 12 prior to adherence of the anti-scatter, anti-lacerative layer 14 or 36 mentioned above. A suitable H-sheet polarizer material is that sold under Product No. HN-38 by Polaroid Corporation of Cambridge, Mass. Such sheet polarizers act to block and screen out ultraviolet radiation below wavelengths of about 380 nm.

Alternately, a sheet polarizer material 57 like that above may be incorporated in the laminate electro-optic rearview mirror assembly 55 of FIG. 7 where it is laminated and adhered as an interlayer between the front and rear surfaces of intermediate and front glass elements 12b' and 12a' to provide a glass laminate assembly. That glass assembly is substituted for front glass element 12 just as assembly 45 of FIG. 5. As with assembly 45, mirror assembly 55 has increased mechanical strength due to the laminate construction of the front glass panel, may incorporate scatter preventing, anti-lacerative layers 14 or 36 on the front surface of the front glass element 12a' for safety purposes, and reduces UV radiation transmitted into the assembly due to the UV absorbing and blocking function of the sheet polarizer layer 57 and any layer 14 or 36 to increase the lifetime of the assembly.

Figure 8:
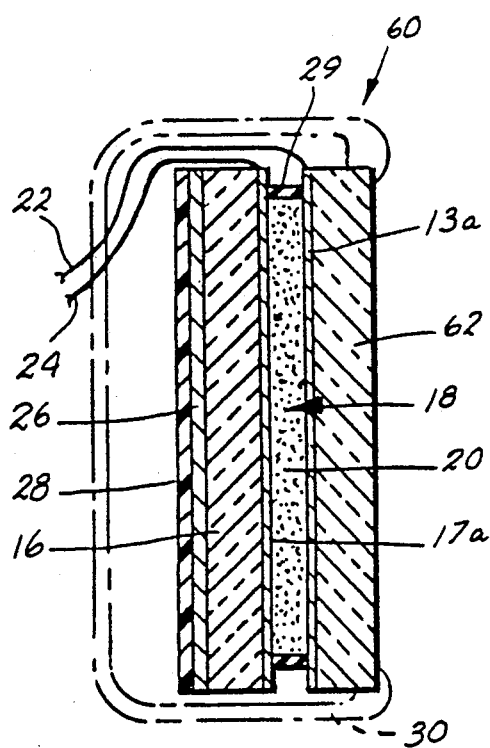
FIG. 8 is an ultraviolet radiation protected laminate, electro-optic rearview mirror assembly of the present invention.

In FIG. 8, where like numerals indicate like parts to those described above, mirror assembly 60 includes a front glass element 62 formed from one of several types of specialized glass rather than conventional soda lime window glass. For example, front glass element 62 may have a higher iron oxide content of within the range of about 0.2% to 0.9% by weight thereby increasing the ultraviolet radiation absorption, blockage and/or screening effect. Similar improvement can be obtained using higher cerium oxide content of 0.2% to 0.9% by weight concentration. Other specialized glasses which have high visible transmission but are strong absorbers in the ultraviolet electromagnetic region can be used including NOVIOL glasses as described in "Spectral-Transmissive Properties and Use of Eye-Protecting Glasses" by R. Stair in National Bureau of Standards Circular 471 (1948). A two millimeter thick sheet of NOVIOL 0 CG306 (National Bureau of Standards Circular, 471 (1948)) transmits only about 12% of the incident ultraviolet radiation at 380 nanometers in contrast to transmission of approximately 70% of the incident ultraviolet radiation at 360 nanometers with a conventional soda lime window glass sheet. This is true even when such NOVIOL glass is coated with indium tin oxide as an electrical conductor. Conventional soda lime glass begins to screen out significant amounts of ultraviolet radiation only below about 300 nm.

Other useful specialty glasses include UV-36 (trademark) glass available from Hoya Corporation of Tokyo, Japan having an average transition wavelength of about 360 nm such that it cuts off ultraviolet radiation below that wavelength. Transition wavelength is the wavelength at the midpoint of the transition interval where glass goes from being highly transmitting to visible radiation to being highly absorbing for UV radiation. Other glasses which can be used include L-1B (trademark) also available from Hoya Corporation having an average transition wavelength of 420 nm. Other examples include CS0501, No. 0-51 available from Corning Glass Works, Corning, N.Y. having a transmittance less than 0.5% at 334 nm and lower at shorter wavelengths but being highly transmitting in the visible electromagnetic region and FG-62 (trademark) available from Ohara Optical Glass Manufacturing Company, Ltd. of Tokyo, Japan, having a UV cutoff just slightly below 400 nm. Such ultraviolet radiation reducing glasses may be used either with or without scatter preventing, anti-lacerative, UV reducing layers 14 or 36 or the UV reducing coatings mentioned above. When used, however, the scatter preventing, anti-lacerative layers have the added advantage of significantly strengthening such glass which, in many instances, are mechanically weaker than conventional window glass. In addition such speciality glasses may be used in the laminate assemblies substituted for front element 12 as described with FIGS. 5 and 7.

As mentioned above, elements 12, 16 may also be cut or cast from clear plastic sheet material such as acrylic or polycarbonate and used in place of front element 62 of FIG. 8. Additives such as benzotriazoles and benzophenones may be incorporated in the plastic to reduce UV radiation transmission. Other UV reducing layers or coatings as described herein, including polymer layers 14, 36, may also be used in combination with the plastic elements.

As shown in FIG. 9, wide band, ultraviolet radiation, dielectric, dichroic or reflective filter materials may also be used in conjunction with the front glass or plastic elements 12 or 62. Suitable dichroic filter or reflective materials include thin film coatings 67 which significantly reduce ultraviolet transmission. Thin film layers 67 can be applied to any glass or plastic surface ahead of the UV vulnerable electro-optic mirror medium 20 but preferably on front or first surface 11. A suitable thin film coating is the ultraviolet wide band dichroic filter available from Optical Coatings Laboratory, Inc. of Santa Rosa, Calif. When applied to the rear surface of front element 12 or 62 as shown in FIG. 9 in solid lines, coatings 67 are interposed between the element rear surface and ITO coating 13a. When applied to the front surface 11, however, thin film coatings 67 are interposed between the front surface and the scatter preventing, anti-lacerative layer 14 or 36 as illustrated in phantom. Thin film coatings 67 have a transmission of visible light over 80% at 550 nm with a sharply lowered transmission of about 5% at 400 nm at which level the thin films become reflecting to UV radiation.

As a substitute for the thin film coatings 67, ultraviolet radiation blocking paints or lacquers can be applied to the element surfaces provided such paints or lacquers are transparent to visible light. A suitable material for layer 70 is a lacquer supplied as ZLI-2456 transparent UV protecting lacquer by E. M. Industries of Hawthorne, N.Y. Such lacquer substantially reduces UV radiation transmitted into the assembly and is preferably applied to front surface 11 of element 12 to avoid dissolving in medium 20.

For example, the above UV protecting lacquer ZLI-2456 was coated on a one mm thick sheet of ITO conductive glass to a thickness of about 30 microns. The transmission spectrum of such coated glass is shown in FIG. 3. It has a sharp transmission cut-off below about 400 nm and greatly reduces UV radiation in the 290 nm to 400 nm region as compared to that normally transmitted by ITO coated glass (see FIG. 4).

Thin film coatings or UV reducing paint or lacquer layers 67, 70 may be used with conventional soda lime window glass as front glass element 12, or with specialized UV radiation reducing or higher iron oxide containing glass, or other UV reducing elements 62 such as the plastic elements mentioned above.

Figure 10:
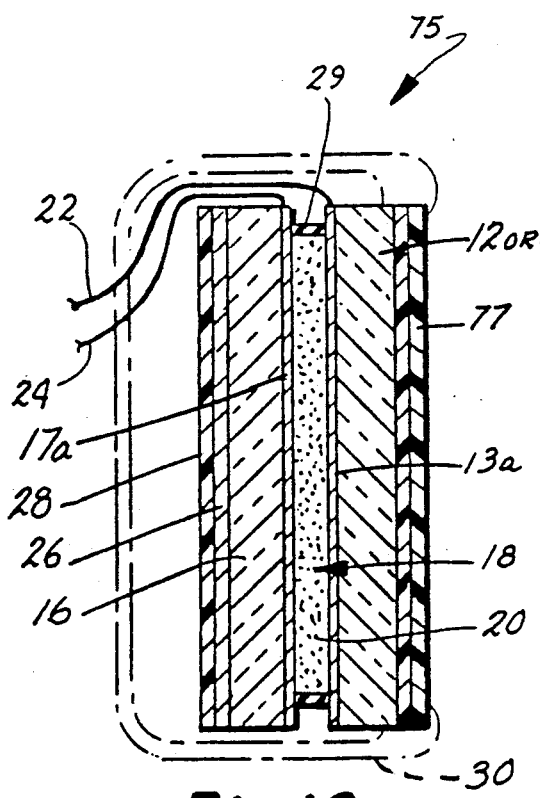
FIG. 10 is a scatter protected, anti-lacerative, anti-fogging, laminate, electro-optic rearview mirror assembly.

As shown in FIG. 10, a further embodiment 75 of the laminate electro-optic rearview mirror assembly is illustrated including a scatter preventing, anti-lacerative layer 77 similar to the polyvinylbutyral/polyester composite layer 36 described above in connection with FIG. 2 but also including silicone moieties chemically incorporated in the anti-lacerative composite. Polymer layer 77 including the silicone additive prevents condensation and/or beading up of condensed water on the coated front surface 11 of front mirror element 12, 62 in high humidity conditions thereby providing an anti-fogging, anti-misting result. A material found useful as anti-lacerative, anti-fogging layer 77 is silicone impregnated polyurethane supplied under the trade name CLARIFLEX (trademark) by Saint-Gobain Vitrage of Paris, France. UV reducing additives such as those described above in connection with FIG. 2 may also be incorporated in the anti-lacerative, anti-fogging layer to increase the lifetime of the assembly. Alternately, front glass element 12, 62 may be fashioned from conventional soda lime glass, UV reducing specialized glasses, or polymer plastics. It is also possible to utilize thin film coatings or UV reducing paints or lacquers 67, 70 on at least one surface of front element 12, 62 when the anti-lacerative, anti-fogging layer is incorporated.

It is also possible to incorporate UV radiation reducing or absorbing stabilizers directly in the electro-optic medium 20 injected or otherwise inserted in space 18. Such absorbers may be dissolved directly in t he medium, e.g., an electrochemichromic liquid. The UV absorbers are selected to be compatible with the ingredients of the medium 20, such that they do not affect the electrical performance and function of the medium or oxidize or reduce in the assembly.

As an example, a laminate electrochemichromic mirror was fabricated as described in the above example in connection with FIG. 2 except that no anti-lacerative layer Was used over front glass element 12. In addition, UV stabilizers Cyasorb UV1084 and Cyasorb UV5411, from American Cyanamid of Stamford, Conn. were added to the electrochemichromic active solution prior to filling into the gap 20 between front glass 12 and back glass 16. Concentration for the UV1084 was 0.6% by volume and the UV5411 was 0.6% by volume g/cc.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. An anti-lacerative, scatter protected, laminate, electro-optic rearview mirror assembly adapted to reduce laceration injuries and scattering of glass fragments if damaged or broken comprising:
   first and second spaced, optically transparent elements mounted in a mirror case, said elements each having front and rear surfaces and defining a space between the rear surface of said first element and the front surface of said second element;
   an electro-optic medium confined in said space whose light transmittance is variable upon the application of an electric field thereto;
   means for applying an electric field to said electro-optic medium to cause variation in the light transmittance of said medium;
   a reflective coating on one surface of said second element adapted to reflect light incident thereon through said first element and said electro-optic medium; and
   a layer of optically transparent, tear/perforation resistant material adhered to said front surface of said first element for retaining and preventing scattering of fragments from said element in the event of damage/breakage of said first element and for reducing the risk of laceration from contact with said first element when damaged/broken;

said first element being a laminate assembly including a pair of glass panels adhered to one another by a polymer layer which also reduces UV radiation transmittance to said assembly and electro-optic medium;

said layer of transparent, tear/perforation resistant material being adhered to the front surface of the outermost of said pair of glass panels, reducing UV transmission to said assembly, and being selected from the group including reticulated polyurethane and a composite including a layer of polyvinylbutyral and a layer of polyester.

2. The mirror assembly of claim 1 wherein said polymer layer between said pair of glass panels is an adhesive bonding substance selected from the group including polyvinylbutyral and acrylic.

3. The mirror assembly of claim 1, wherein said reticulated polyurethane layer has a thickness within the range from about 0.01 to about 0.25 inches.

4. The mirror assembly of claim 1 wherein said polyvinylbutyral/polyester composite has a thickness within a range of about 0.005 to about 0.25 inches, said polyester layer being outermost to provide abrasion and weather resistance, said polyvinylbutyral layer providing tear and laceration resistance and ultraviolet radiation transmittance reduction.

5. An anti-lacerative, scatter protected, laminate, electro-optic rearview mirror assembly adapted to reduce laceration injuries and scattering of glass fragments if damaged or broken comprising:

first and second spaced, optically transparent elements mounted in a mirror case, said elements each having front and rear surfaces and defining a space between the rear surface of said first element and the front surface of said second element;

an electro-optic medium confined in said space whose light transmittance is variable upon the application of an electric field thereto;

means for applying an electric field to said electro-optic medium to cause variation in the light transmittance of said medium;

a reflective coating on one surface of said second element adapted to reflect light incident thereon through said first element and said electro-optic medium; and a layer of optically transparent, tear/perforation resistant material adhered to said front surface of said first element for retaining and preventing scattering of fragments from said element in the event of damage/breakage of said first element and for reducing the risk of laceration from contact with said first element when damaged/broken;

said first element being a laminate assembly including a pair of glass panels adhered to one another by a polymer layer which also reduces UV radiation transmittance to said assembly and electro-optic medium;

said layer of transparent, tear/perforation resistant material being adhered to the front surface of the outermost of said pair of glass panels;

said polymer layer being an H-sheet polarizer.

6. An anti-lacerative, scatter protected, laminate, electro-optic rearview mirror assembly adapted to reduce laceration injuries and scattering of glass fragments if damaged or broken comprising:

first and second spaced, optically transparent elements mounted in a mirror case, said elements each having front and rear surfaces and defining a space between the rear surface of said first element and the front surface of said second element;

an electro-optic medium confined in said space whose light transmittance is variable upon the application of an electric field thereto;

means for applying an electric field to said electro-optic medium to cause variation in the light transmittance of said medium;

a reflective coating on one surface of said second element adapted to reflect light incident thereon through said first element and said electro-optic medium; and a layer of optically transparent, tear/perforation resistant material adhered to said front surface of said first element for retaining and preventing scattering of fragments from said element in the event of damage/breakage of said first element and for reducing the risk of laceration from contact with said first element when damaged/broken;

said assembly including a wide band, UV radiation reflecting, filter material applied to at least one surface of said first element for reducing transmission of IV radiation to said electro-optic medium and said assembly, said filter material including a series of thin film layers forming a stack.

7. An anti-lacerative, scatter protected, laminate, electro-optic rearview mirror assembly adapted to reduce laceration injuries and scattering of glass fragments if damaged or broken comprising:

first and second spaced, optically transparent elements mounted in a mirror case, said elements each having front and rear surfaces and defining a space between the rear surface of said first element and the front surface of said second element;

an electro-optic medium confined in said space whose light transmittance is variable upon the application of an electric field thereto;

means for applying an electric field to said electro-optic medium to cause variation in the light transmittance of said medium;

a reflective coating on one surface of said second element adapted to reflect light incident thereon through said first element and said electro-optic medium; and a layer of optically transparent, tear/perforation resistant material adhered to said front surface of said first element for retaining and preventing scattering of fragments from said element in the event of damage/breakage of said first element and for reducing the risk of laceration from contact with said first element when damaged/broken;

said assembly also including a coating of UV radiation reducing paint/lacquer on said first element, which coating is optically transparent to light in the visible spectrum but absorbs/blocks ultraviolet radiation.

8. An anti-lacerative, scatter protected, laminate, electro-optic rearview mirror assembly adapted to reduce laceration injuries and scattering of glass fragments if damaged or broken comprising:

first and second spaced, optically transparent elements mounted in a mirror case, said elements each having front and rear surfaces and defining a space between the rear surface of said first element and the front surface of said second element;

an electro-optic medium confined in said space whose light transmittance is variable upon the application of an electric field thereto;

means for applying an electric field to said electro-optic medium to cause variation in the light transmittance of said medium;

a reflective coating on one surface of said second element adapted to reflect light incident thereon through said first element and said electro-optic medium; and a layer of optically transparent, tear/perforation resistant material adhered to said front surface of said first element for retaining and preventing scattering of fragments from said element in the event of damage/breakage of said first element and for reducing the risk of laceration from contact with said first element when damaged/broken;

said assembly also including ultraviolet radiation reducing means incorporated with said first element for reducing transmission of ultraviolet radiation into said electro-optic medium and said assembly; said UV radiation reducing means including a sheet of specialized glass which is highly transmitting in the visible portion of the electromagnetic spectrum but has greatly reduced transmission in the ultraviolet portion of the electromagnetic spectrum.

9. The mirror assembly of claim 8 wherein said first element is formed from said specialized glass, said specialized glass being selected from the group consisting of glass having a higher iron oxide content than conventional soda lime glass, said iron oxide content being at least 0.2% to 0.9% by weight, and glass having a higher cerium oxide content than conventional soda lime glass, said cerium oxide content being at least 0.2% to 0.9% by weight.

10. An anti-lacerative, scatter protected, laminate, electro-optic rearview mirror assembly adapted to reduce laceration injuries and scattering of glass fragments if damaged or broken comprising:

first and second spaced, optically transparent elements mounted in a mirror case, said elements each having front and rear surfaces and defining a space between the rear surface of said first element and the front surface of said second element;

an electro-optic medium confined in said space whose light transmittance is variable upon the application of an electric field thereto;

means for applying an electric field to said electro-optic medium to cause variation in the light transmittance of said medium;

a reflective coating on one surface of said second element adapted to reflect light incident thereon through said first element and said electro-optic medium; and a layer of optically transparent, tear/perforation resistant material adhered to said front surface of said first element for retaining and preventing scattering of fragments from said element in the event of damage/breakage of said first element and for reducing the risk of laceration from contact with said first element when damaged/broken;

said assembly also including an anti-misting/anti-fogging additive incorporated in said layer of transparent, tear/perforation resistant material whereby fogging of said first element is resisted and clarity of reflected images in said mirror is maintained in high humidity conditions.

11. The mirror assembly of claim 24 wherein said layer incorporating said anti-misting/anti-fogging additive is a layer of silicone impregnated polyurethane.

12. A reduced ultraviolet radiation transmitting, laminate, electro-optic rearview mirror assembly comprising:

first and second spaced, optically transparent elements mounted in a mirror case, said elements each having front and rear surfaces and defining a space between the rear surface of said first element and the front surface of said second element;

an electro-optic medium confined in said space whose light transmittance is variable upon the application of an electric field thereto;

means for applying an electric field to said electro-optic medium to cause variation in the light transmittance of said medium;

a reflective coating on one surface of said second element adapted to reflect light incident thereon through said first element and said electro-optic medium; and ultraviolet radiation reducing means incorporated in said assembly for reducing transmission of ultraviolet radiation into said electro-optic medium and said assembly;

said UV radiation reducing means including a sheet of specialized glass as said first element, said specialized glass sheet being highly transmitting in the visible portion of the electromagnetic spectrum but having greatly reduced transmission in the ultraviolet portion of the electromagnetic spectrum.

13. The mirror assembly of claim 12 wherein said specialized glass is selected from the group consisting of glass having a higher iron oxide content than conventional soda lime glass, said iron oxide content being at least 0.2% to 0.9% by weight, and glass having a higher cerium oxide content than conventional soda lime glass, said cerium oxide content being at least 0.2% to 0.9% by weight.

14. A reduced ultraviolet radiation transmitting, laminate, electro-optic rearview mirror assembly comprising:

first and second spaced, optically transparent elements mounted in a mirror case, said elements each having front and rear surfaces and defining a space between the rear surface of said first element and the front surface of said second element;

an electro-optic medium confined in said space whose light transmittance is variable upon the application of an electric field thereto;

means for applying an electric field to said electro-optic medium to cause variation in the light transmittance of said medium;

a reflective coating on one surface of said second element adapted to reflect light incident thereon through said first element and said electro-optic medium; and ultraviolet radiation reducing means incorporated in said assembly for reducing transmission of ultraviolet radiation into said electro-optic medium and said assembly;

said ultraviolet radiation reducing means including a wide band, UV radiation reflecting filter material applied to at least one surface of said first element for reducing transmission of UV radiation to said electro-optic medium and said assembly, said filter material including a series of thin film layers forming a stack.

15. A reduced ultraviolet radiation transmitting, laminate, electro-optic rearview mirror assembly comprising:
  first and second spaced, optically transparent elements mounted in a mirror case, said elements each having front and rear surfaces and defining a space between the rear surface of said first element and the front surface of said second element;
  an electro-optic medium confined in said space whose light transmittance is variable upon the application of an electric field thereto;
  means for applying an electric field to said electro-optic medium to cause variation in the light transmittance of said medium;
  a reflective coating on one surface of said second element adapted to reflect light incident thereon through said first element and said electro-optic medium; and
  ultraviolet radiation reducing means incorporated in said assembly for reducing transmission of ultraviolet radiation into said electro-optic medium and said assembly;
  said ultraviolet radiation reducing means including a UV radiation reducing coating of paint/lacquer on said first element which is optically transparent to light in the visible spectrum but absorbs/blocks ultraviolet radiation.

16. A reduced ultraviolet radiation transmitting, scatter protected, laminate, electro-optic rearview mirror assembly comprising;
  first and second spaced, optically transparent elements mounted in a mirror case, said elements each having front and rear surfaces and defining a space between the rear surface of said first element and the front surface of said second element;
  an electro-optic medium confined in said space whose light transmittance is variable upon the application of an electric field thereto;
  means for applying an electric field to said electro-optic medium to cause variation in the light transmittance of said medium;
  a reflective coating on one surface of said second element adapted to reflect light incident thereon through said first element and said electro-optic medium; and
  ultraviolet radiation reducing means incorporated in said assembly for reducing transmission of ultraviolet radiation into said electro-optic medium and said assembly;
  said first element being a laminate assembly including a pair of glass panels adhered to one another by an optically clear, resilient, tear-resistant polymer interlayer of thickness greater than 0.005 inches, said polymer interlayer providing said scatter protection and comprising said ultraviolet radiation reducing means.

17. The mirror assembly of claim 16 wherein said polymer interlayer between said pair of glass panels is formed from UV stable, plasticized polyvinylbutyral sheet.

18. The mirror assembly of claim 16 wherein at least one of said pair of glass panels is formed from glass which has a high visible transmission but substantially absorbs solar radiation above about 290 nm and below about 400 nm.

19. The mirror assembly of claim 16 wherein said polymer layer between said pair of glass panels is a plasticized polyvinylbutyral sheet which substantially absorbs solar radiation above about 290 nm and below about 400 nm.

20. The mirror assembly of claim 16 wherein said electro-optic medium includes an ultraviolet radiation reducing/absorbing additive therein.

21. A reduced ultraviolet radiation transmitting, laminate, electro-optic rearview mirror assembly comprising:
  first and second spaced, optically transparent elements mounted in a mirror case, said elements each having front and rear surfaces and defining a space between the rear surface of said first element and the front surface of said second element;
  an electro-optic medium confined in said space whose light transmittance is variable upon the application of an electric field thereto;
  means for applying an electric field to said electro-optic medium to cause variation in the light transmittance of said medium;
  a reflective coating on one surface of said second element adapted to reflect light incident thereon through said first element and said electro-optic medium; and
  ultraviolet radiation reducing means incorporated in said assembly for reducing transmission of ultraviolet radiation into said electro-optic medium and said assembly;
  said first element being formed from clear plastic and incorporating a UV radiation transmission reducing additive therein.

22. A reduced ultraviolet radiation transmitting, laminate, electro-optic rearview mirror assembly comprising:
  first and second spaced, optically transparent elements mounted in a mirror case, said elements each having front and rear surfaces and defining a space between the rear surface of said first element and the front surface of said second element;
  an electro-optic medium confined in said space whose light transmittance is variable upon the application of an electric field thereto;
  means for applying an electric field to said electro-optic medium to cause variation in the light transmittance of said medium;
  a reflective coating on one surface of said second element adapted to reflect light incident thereon through said first element and said electro-optic medium; and
  ultraviolet radiation reducing means incorporated in said assembly for reducing transmission of ultraviolet radiation into said electro-optic medium and said assembly;
  said first element being a laminate assembly including a pair of glass panels adhered to one another by a polymer layer, said polymer layer comprising said ultraviolet radiation reducing means; at least one of said pair of glass panels being formed from glass which has a high visible transmission but substantially absorbs ultraviolet radiation below about 400 nm; each one of said pair of glass panels being formed from specialized glass having an increased ultraviolet radiation absorption, blockage and/or screening effect as compared to conventional soda lime glass.

23. A reduced ultraviolet radiation transmitting, scatter protected, laminate, electrochromic rearview mirror assembly comprising:

first and second spaced, optically transparent elements mounted in a mirror case, said elements each having front and rear surfaces and defining a space between the rear surface of said first element and the front surface of said second element;

an electrochromic medium confined in said space whose light transmittance is variable upon the application of an electric field thereto;

means for applying an electric field to said electrochromic medium to cause variation in the light transmittance of said medium;

a reflective coating on one surface of said second element adapted to reflect light incident thereon through said first element and said electrochromic medium; and ultraviolet radiation reducing means incorporated in said assembly for reducing transmission of ultraviolet radiation into said electrochromic medium and said assembly;

said first element being a laminate assembly including a pair of glass panels adhered to one another by a polymer interlayer, said polymer interlayer providing said scatter protection and comprising said ultraviolet radiation reducing means;

said ultraviolet radiation reducing means also including an ultraviolet radiation reducing/absorbing additive in solution with said electrochromic medium, said additive also stabilizing said medium against degradation from ultraviolet radiation.

24. An ultraviolet protected, electrochromic assembly comprising:

first and second spaced, optically transparent elements, said elements each having front and rear surfaces and defining a space between the rear surface of said first element and the front surface of said second element;

an electrochromic medium confined in said space whose light transmittance is variable upon the application of an electric field thereto;

means for applying an electric field to said electrochromic medium to cause variation in the light transmittance of said medium;

ultraviolet radiation reducing means incorporated in said assembly for reducing transmission of ultraviolet radiation into said electrochromic medium and said assembly; said ultraviolet radiation reducing means including at least one additive for absorbing, blocking and/or screening ultraviolet radiation in solution with said electrochromic medium, said additive stabilizing said medium against degradation from ultraviolet radiation.

25. The assembly of claim 24 wherein said additive is selected to avoid effecting electrical performance and function of said medium and does not oxidize or reduce in said assembly during electrical operation thereof.

26. The assembly of claim 24 wherein said additive is selected from the group consisting of benzophenones, cinnamic acid derivatives, esters of benzoin acids, salicylic acid, terephthalic and isophthalic acids with resorcinol and phenols, pentamethyl piperidine derivatives, salicylates, benzotriazoles, cyanoacrylates, benzilidenes, malonates and oxalanilides.

27. The assembly of claim 26 wherein said additive is combined with an additional additive selected from the group consisting of nickel chelates and hindered amines.

28. The assembly of claim 24 wherein said additive is a combination of a benzotriazole and a nickel chelate.

29. The assembly of claim 24 wherein said first and second optically transparent elements are glass; said electrochromic medium being an electrochemichromic active solution.

30. The assembly of claim 24 wherein said first optically transparent element is located closest to the source of the ultraviolet radiation.

31. The assembly of claim 30 wherein said first optically transparent element is a laminate assembly including a pair of glass panels adhered to one another by a resilient, tear-resistant polymer interlayer of thickness greater than 0.005 inches, said polymer interlayer comprising said ultraviolet radiation reducing means.

32. The assembly of claim 30 wherein said ultraviolet radiation reducing means also include a wide band, ultraviolet radiation reflecting, filter material applied to at least one surface f said first element, said filter material including a series of thin film layers forming a stack.

33. The assembly of claim 30 wherein said ultraviolet radiation reducing means also include a coating of ultraviolet radiation reducing paint/lacquer on said first element, said coating being optically transparent to light in the visible spectrum but absorbing/blocking ultraviolet radiation.

34. The assembly of claim 30 wherein said ultraviolet radiation reducing means also include a sheet of specialized glass forming said first element, said specialized glass sheet being highly transmitting in the visible portion of the electromagnetic spectrum but having greatly reduced transmission in the ultraviolet portion of the electromagnetic spectrum.

35. The assembly of claim 30 wherein said first element is formed from clear plastic, said ultraviolet radiation reducing means also including an ultraviolet radiation transmission reducing additive in said clear plastic.

36. The assembly of claim 30 wherein said ultraviolet radiation reducing means also include a coating of clear plastic on said front surface of said first element, said coating incorporating an additive for reducing transmission of ultraviolet radiation therethrough.

37. The assembly of claim 30 wherein said ultraviolet radiation reducing means also include a layer of ultraviolet radiation absorbing material bonded to said front surface with a clear, transparent, adhesive, said adhesive incorporating an additive for reducing transmission of ultraviolet radiation therethrough.

38. An anti-lacerative scatter protected, laminate, electro-optic rearview mirror assembly adapted to reduce laceration injuries and scattering of glass fragments if damaged or broken comprising;

first and second spaced, optically transparent elements mounted in a mirror case, said elements each having front and rear surfaces and defining a space between the rear surface of said first element and the front surface of the second element;

an electro-optic medium confined in said space whose light transmittance is variable upon the application of an electric field thereto;

means for applying an electric field to said electro-optic medium to cause variation in the light transmittance of said medium;

a reflective coating on one surface of said second element adapted to reflect light incident thereon through said first element and said electro-optic medium; and a layer of optically transparent, tear/perforation resistant material adhered to said front surface of said first element for retaining and preventing scattering of fragments from said element in the event of damage/breakage of said first element and for reducing risk of laceration from contact with said first element when damaged/broken; said layer of transparent, tear/perforation resistant material reducing ultraviolet radiation transmission to said assembly and being selected from the group including reticulated polyurethane and a composite including a layer of polyvinylbutyral and a layer of polyester, said composite having a thickness within a range of about 0.005 to about 0.25 inches, said polyester layer being outermost to provide abrasion and weather resistance, said polyvinylbutyral layer providing tear and laceration resistance and ultraviolet radiation transmittance reduction.

39. The mirror assembly of claim 38 wherein said electro-optic medium includes an ultraviolet radiation reducing/absorbing additive therein.

* * * * *

UNITED STATES PATENT AND TRADEMARK OFFICE
CERTIFICATE OF CORRECTION

PATENT NO. : 5,073,012  Page 1 of 2

DATED : December 17, 1991

INVENTOR(S) : Niall R. Lynam

It is certified that error appears in the above-identified patent and that said Letters Patent is hereby corrected as shown below:

Col. 1, line 57
After "manner" insert --.--.

Col. 5, line 46
"reflect an" should be --reflect any--.

Col. 5, line 54
"such a" should be --such as--.

Col. 7, line 15
"us of" should be --use of--.

Col. 9, line 4
"stabilize" should be --stabilized--.

Col. 9, line 65
After "solution" insert --.--.

Col. 10, line 54
After "spectrum" insert --.--.

Col. 10, line 62
After "injuries" insert --.--.

Col. 11, line 29
"to a" should be --to an--.

Col. 14, line 18
"in t he" should be --in the--.

UNITED STATES PATENT AND TRADEMARK OFFICE
CERTIFICATE OF CORRECTION

PATENT NO. : 5,073,012

DATED : December 17, 1991

INVENTOR(S) : Niall R. Lynam

It is certified that error appears in the above-identified patent and that said Letters Patent is hereby corrected as shown below:

Col. 14, line 27
"Was" should be --was--.

Col. 22, line 17, claim 32
"surface f" should be --surface of--.

Signed and Sealed this

Seventeenth Day of August, 1993

Attest:

BRUCE LEHMAN

Attesting Officer    Commissioner of Patents and Trademarks